(12) United States Patent
Nakamura et al.

(10) Patent No.: US 7,862,473 B2
(45) Date of Patent: Jan. 4, 2011

(54) FLUID SUPPLY DEVICE AND FLUID SUPPLY METHOD OF FLUID COUPLING

(75) Inventors: Kazuaki Nakamura, Toyota (JP); Kazuyuki Watanabe, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 565 days.

(21) Appl. No.: 11/994,722

(22) PCT Filed: Aug. 15, 2006

(86) PCT No.: PCT/JP2006/316289

§ 371 (c)(1),
(2), (4) Date: Jan. 4, 2008

(87) PCT Pub. No.: WO2007/023752

PCT Pub. Date: Mar. 1, 2007

(65) Prior Publication Data

US 2009/0118953 A1  May 7, 2009

(30) Foreign Application Priority Data

Aug. 25, 2005  (JP)  ............................. 2005-244533

(51) Int. Cl.
*F16H 59/60*  (2006.01)
(52) U.S. Cl. .......................... 477/97; 477/50; 477/127; 477/156
(58) Field of Classification Search .................. 477/50, 477/97, 127, 156
See application file for complete search history.

(56) References Cited

U.S. PATENT DOCUMENTS

| 2,214,190 | A | * | 9/1940 | Auer | ............................. 60/337 |
| 2,289,440 | A | * | 7/1942 | Kugel | ........................... 236/35 |
| 2,451,835 | A | * | 10/1948 | Johnson | ....................... 454/71 |
| 2,631,432 | A | * | 3/1953 | Newcomb | ..................... 60/329 |
| 3,063,245 | A | | 11/1962 | Rippy | |
| 3,347,042 | A | | 10/1967 | Horsch | |
| 4,132,299 | A | * | 1/1979 | Rohrer et al. | .......... 192/58.682 |
| 5,884,742 | A | | 3/1999 | Spintzyk | |

FOREIGN PATENT DOCUMENTS

| DE | 43 42 961 | 4/1995 |
| JP | 1 77108 | 5/1989 |
| JP | 2 271147 | 11/1990 |
| JP | 10 205616 | 8/1998 |
| JP | 2001 159458 | 6/2001 |

* cited by examiner

*Primary Examiner*—Ha D. Ho
(74) *Attorney, Agent, or Firm*—Oblon, Spivak, McClelland, Maier & Neustadt, L.L.P.

(57) ABSTRACT

An ECU executes a program including outputting, when the oil temperature THO of ATF<the threshold value THO (0), a control signal to the solenoid valve to control the solenoid valve to cause the lock-up relay valve to enter the state of resupplying the ATF discharged from the torque converter to the torque converter. In the state where the ATF discharged from the torque converter is being resupplied to the torque converter, the second oil path guiding the ATF discharged from the torque converter to the oil pan is disconnected from the torque converter.

15 Claims, 10 Drawing Sheets

FIG. 3

|     | C1 | C2 | B1 | B2 | B3 | F |
|-----|----|----|----|----|----|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R   | × | × | × | ○ | ○ | × |
| N   | × | × | × | × | × | × |

○ ENGAGEMENT
× RELEASE
◎ ENGAGEMENT DURING ENGINE BRAKING
△ ENGAGEMENT ONLY DURING DRIVING

F I G. 9
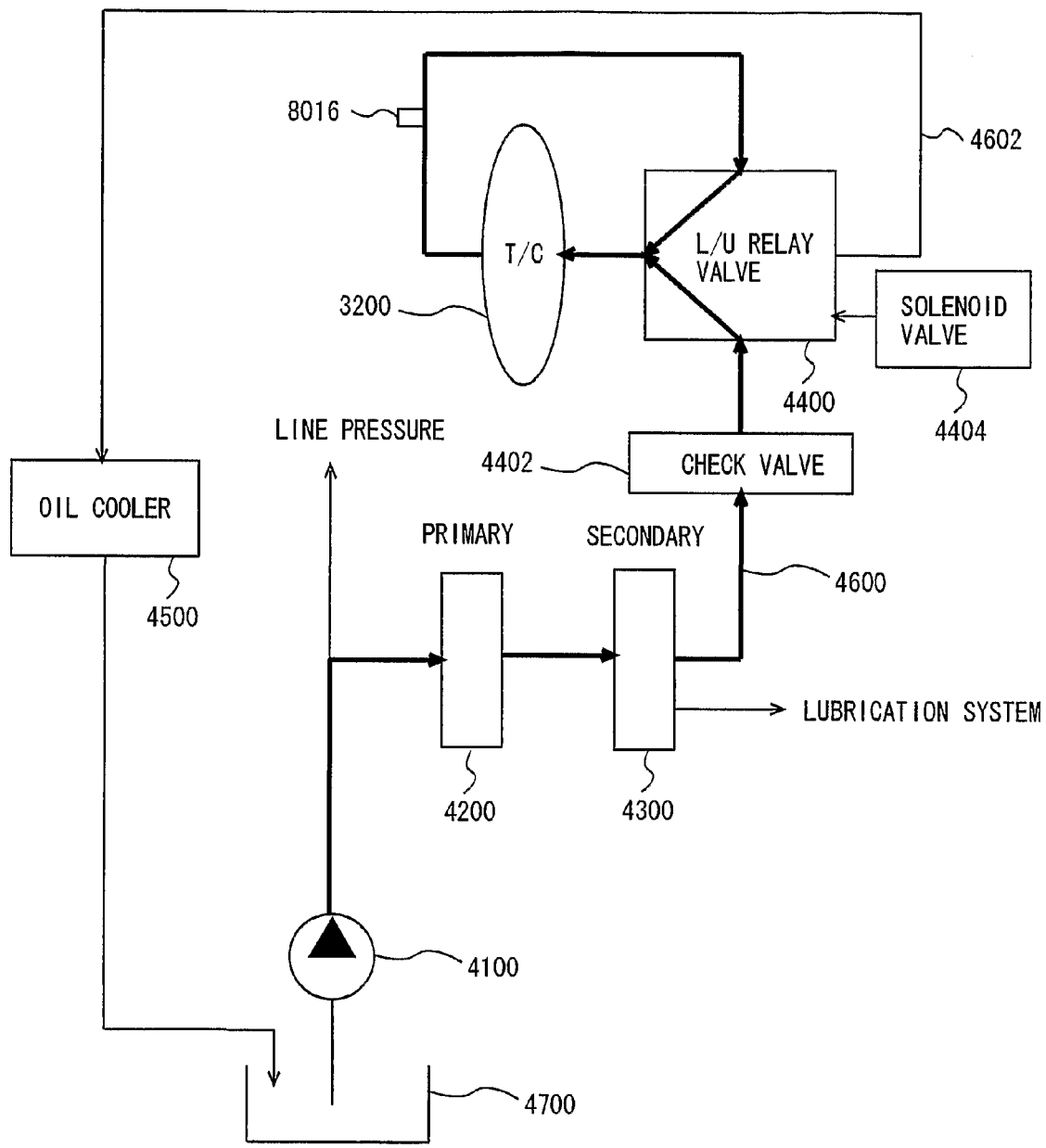

FLUID SUPPLY DEVICE AND FLUID SUPPLY METHOD OF FLUID COUPLING

TECHNICAL FIELD

The present invention relates to a fluid supply device and a fluid supply method of a fluid coupling, and more particularly to a technique of resupplying a fluid discharged from a fluid coupling to the fluid coupling.

BACKGROUND ART

Conventionally, an engine and an automatic transmission are coupled via a fluid coupling (torque converter). ATF (Automatic Transmission Fluid) supplied to the torque converter is suctioned by an oil pump from an oil pan provided beneath the automatic transmission. For example at very low temperature, the oil level lowers with a decrease in volume of the ATF, and the amount of the oil returned to the oil pan decreases with an increase in viscosity, in which case the air may be suctioned together with the ATF.

Japanese Patent Laying-Open No. 02-271147 discloses an oil storing device of an automatic transmission capable of suppressing intake of the air. In the oil storing device of an automatic transmission described in Japanese Patent Laying-Open No. 02-271147, oil for use in controlling the oil pressure is stored in an oil reservoir beneath the automatic transmission, and an oil strainer is provided such that the suction port is located below the oil level. The oil storing device includes a variable capacity chamber of which capacity can be changed in accordance with the pressure of the fluid supplied inside, which chamber is provided in the oil reservoir such that it expands/contracts in the direction orthogonal to the sidewall surface of the oil reservoir. The pressure of the fluid in the variable capacity chamber is adjustable by means of a fluid pressure control device provided outside the oil reservoir. The fluid pressure control device is configured to increase the fluid pressure when it is necessary to raise the oil level. When the engine is started in the low temperature state, blow-by gas is introduced into the variable capacity chamber, whereby the variable capacity chamber expands.

According to the oil storing device of an automatic transmission described in this publication, the variable capacity chamber is provided to face the inner wall surface of the oil reservoir and made to expand in the direction orthogonal to the sidewall surface as necessary. At the time when the air is likely to be taken in through the suction port of the oil strainer as in the state of low temperature, in the case of rapid acceleration/deceleration, or in the case of sharp turn or the like, the variable capacity chamber is expanded to push aside the oil, to thereby raise the oil level. This can suppress intake of the air.

In the oil storing device of an automatic transmission described in Japanese Patent Laying-Open No. 02-271147, however, the variable capacity chamber is expanded by the blow-by gas. As such, in the case where the amount of the blow-by gas is insufficient, immediately after startup of the engine for example, there may be a case where the oil level cannot be raised sufficiently, in which case the air may be taken in. If the air thus taken in is fed to the fluid coupling provided between the engine and the automatic transmission, the air may accumulate inside the fluid coupling, leading to degradation in motive power transfer capability of the fluid coupling.

DISCLOSURE OF THE INVENTION

An object of the present invention is to provide a fluid supply device and a fluid supply method of a fluid coupling that can suppress accumulation of the air in the fluid coupling and suppress degradation in motive power transfer capability of the fluid coupling.

A fluid supply device of a fluid coupling according to an aspect of the present invention includes: a delivery portion delivering fluid stored in a storage portion to a fluid coupling via a first flow path; a second flow path guiding the fluid discharged from the fluid coupling to the storage portion; and a supply portion disconnecting the second flow path from the fluid coupling and resupplying the fluid discharged from the fluid coupling to the fluid coupling when a temperature of the fluid supplied to the fluid coupling is lower than a predetermined temperature.

According to this invention, the fluid stored in the storage portion is guided to the fluid coupling, and the fluid discharged from the fluid coupling is guided to the storage portion. At this time, if the oil temperature is low, the volume of the fluid decreases, so that the level of the fluid stored in the storage portion lowers. Further, since viscosity of the fluid increases, the amount of the fluid returned to the storage portion decreases, which also results in a lowered level of the fluid stored in the storage portion. In this state, when the fluid is suctioned by the delivery portion, the air may also be suctioned. If the suctioned air is introduced into the fluid coupling, the air may accumulate in the fluid coupling, which may degrade motive power transfer capability of the fluid coupling. Accordingly, in the case where the temperature of the fluid supplied to the fluid coupling is lower than a predetermined temperature, the second flow path is disconnected from the fluid coupling, and the fluid discharged from the fluid coupling is resupplied to the fluid coupling. This can prevent the fluid from being newly supplied to the fluid coupling from the storage portion via the first flow path, and thus, can prevent the air suctioned together with the fluid from the storage portion from being fed to the fluid coupling. As a result, it is possible to provide a fluid supply device of a fluid coupling that can suppress accumulation of the air in the fluid coupling and can restrict degradation in motive power transfer capability of the fluid coupling.

Preferably, the fluid supply device further includes a maintaining portion maintaining pressure of the fluid supplied to the fluid coupling at a level higher than a predetermined pressure in the state where the second flow path is disconnected from the fluid coupling and the fluid discharged from the fluid coupling is being resupplied to the fluid coupling.

According to this invention, the pressure of the fluid supplied to the fluid coupling is maintained at the level higher than a predetermined pressure in the state where the second flow path is disconnected from the fluid coupling and the fluid discharged from the fluid coupling is being resupplied to the fluid coupling. This can suppress cavitation that could occur within the fluid coupling, and accordingly, degradation in motive power transfer capability of the fluid coupling can be suppressed.

Still preferably, the fluid supply device further includes: a determination portion determining whether motive power transmitted to the fluid coupling becomes greater than a predetermined value; and a stopping portion establishing communication between the second flow path and the fluid coupling and stopping resupply of the fluid discharged from the fluid coupling to the fluid coupling when it is determined that the motive power transmitted to the fluid coupling becomes greater than the predetermined value in the state where the second flow path is disconnected from the fluid coupling and the fluid discharged from the fluid coupling is being resupplied to the fluid coupling.

According to this invention, it is determined whether the motive power transmitted to the fluid coupling becomes greater than a predetermined value. When the motive power transmitted to the fluid coupling becomes greater than the predetermined value, cavitation may occur unless the pressurized fluid is sufficiently supplied to the fluid coupling. Accordingly, when it is determined that the motive power transmitted to the fluid coupling becomes greater than the predetermined value in the state where the second flow path is disconnected from the fluid coupling and the fluid discharged from the fluid coupling is being resupplied to the fluid coupling, the second flow path is made in communication with the fluid coupling, and the resupply of the fluid discharged from the fluid coupling to the fluid coupling is stopped. This ensures that the pressurized fluid is sufficiently supplied by the delivery portion, and thus, cavitation that could occur in the fluid coupling can be prevented. As a result, it is possible to suppress degradation in motive power transfer capability of the fluid coupling.

Still preferably, the fluid supply device further includes: a stopping portion establishing communication between the second flow path and the fluid coupling and stopping resupply of the fluid discharged from the fluid coupling to the fluid coupling when the state in which the second flow path is disconnected from the fluid coupling and the fluid discharged from the fluid coupling is resupplied to the fluid coupling has continued for a predetermined first time period; and a supply restarting portion disconnecting the second flow path from the fluid coupling and resupplying the fluid discharged from the fluid coupling to the fluid coupling when the state in which the second flow path and the fluid coupling are in communication with each other and resupply of the fluid discharged from the fluid coupling to the fluid coupling is stopped has continued for a predetermined second time period.

According to this invention, when the state in which the second flow path is disconnected from the fluid coupling and the fluid discharged from the fluid coupling is resupplied to the fluid coupling has continued for a predetermined first time period, the second flow path is made in communication with the fluid coupling and resupply of the fluid discharged from the fluid coupling to the fluid coupling is stopped. This can prevent the undesirable situation that the temperature of the fluid within the fluid coupling abnormally increases as the state where the second flow path is disconnected from the fluid coupling and the fluid discharged from the fluid coupling is resupplied to the fluid coupling continues for a long time. When the above-described state continues for a predetermined second time period, the second flow path is disconnected from the fluid coupling, and the fluid discharged from the fluid coupling is again resupplied to the fluid coupling. This can suppress the undesirable situation that the air suctioned by the delivery portion accumulates inside the fluid coupling as the resupply of the fluid discharged from the fluid coupling to the fluid coupling is stopped in the state where there is a possibility that the temperature of the fluid outside the fluid coupling has not sufficiently increased.

Still preferably, the fluid supply device further includes: a stopping portion establishing communication between the second flow path and the fluid coupling and stopping resupply of the fluid discharged from the fluid coupling to the fluid coupling when a temperature of the fluid within the fluid coupling has become not lower than a predetermined first temperature in the state where the second flow path is disconnected from the fluid coupling and the fluid discharged from the fluid coupling is being resupplied to the fluid coupling; and a supply restarting portion disconnecting the second flow path from the fluid coupling and resupplying the fluid discharged from the fluid coupling to the fluid coupling when the temperature of the fluid within the fluid coupling has become lower than a predetermined second temperature in the state where the second flow path is in communication with the fluid coupling and resupply of the fluid discharged from the fluid coupling to the fluid coupling is stopped.

According to this invention, in the state where the fluid discharged from the fluid coupling is being resupplied to the fluid coupling, when the temperature of the fluid within the fluid coupling becomes a predetermined first temperature or higher, the second flow path is made in communication with the fluid coupling and resupply of the fluid discharged from the fluid coupling to the fluid coupling is stopped. As such, the fluid within the fluid coupling, of which temperature has increased as the state where the second flow path is disconnected from the fluid coupling and the fluid discharged from the fluid coupling is resupplied to the fluid coupling has continued for a long time, can be exchanged with the fluid of low temperature outside the fluid coupling. This can suppress an abnormal increase in temperature of the fluid. Further, in this state, when the temperature of the fluid within the fluid coupling becomes lower than a predetermined second temperature, the second flow path is disconnected from the fluid coupling and the fluid discharged from the fluid coupling is again resupplied to the fluid coupling. This can suppress the undesirable situation that the air suctioned by the delivery portion accumulates inside the fluid coupling as the resupply of the fluid discharged from the fluid coupling to the fluid coupling is stopped in the state where there is a possibility that the temperature of the fluid outside the fluid coupling has not sufficiently increased.

A fluid supply method of a fluid coupling according to another aspect of the present invention includes the steps of: discharging fluid discharged from the fluid coupling to a storage portion when a temperature of the fluid supplied to the fluid coupling is not lower than a predetermined temperature; and resupplying the fluid discharged from the fluid coupling to the fluid coupling, without returning the fluid to the storage portion, when the temperature of the fluid supplied to the fluid coupling is lower than the predetermined temperature.

According to this invention, when the temperature of the fluid supplied to the fluid coupling is equal to or higher than a predetermined temperature, the fluid discharged from the fluid coupling is discharged to the storage portion. Meanwhile, if the temperature of the fluid is low, the volume of the fluid decreases, so that the level of the fluid stored in the storage portion lowers. Further, since viscosity of the fluid increases, the amount of the fluid returned to the storage portion decreases, which also results in a lowered level of the fluid stored in the storage portion. Thus, when the fluid is supplied to the fluid coupling, the air may be suctioned. If the suctioned air is introduced into the fluid coupling, the air may accumulate in the fluid coupling, which may degrade motive power transfer capability of the fluid coupling. Accordingly, in the case where the temperature of the fluid supplied to the fluid coupling is lower than a predetermined temperature, the fluid discharged from the fluid coupling is resupplied to the fluid coupling without being returned to the storage portion. This can restrict the amount of the fluid newly supplied to the fluid coupling, and thus, can prevent the suctioned air from being fed to the fluid coupling. As a result, it is possible to provide a fluid supply method of a fluid coupling that can suppress accumulation of the air in the fluid coupling and can restrict degradation in motive power transfer capability of the fluid coupling.

Preferably, the fluid supply method further includes the step of maintaining pressure of the fluid supplied to the fluid coupling at a level higher than a predetermined pressure in the state where the fluid discharged from the fluid coupling is resupplied to the fluid coupling without being returned to the storage portion.

According to this invention, in the state where the fluid discharged from the fluid coupling is resupplied to the fluid coupling without being returned to the storage portion, the pressure of the fluid supplied to the fluid coupling is maintained at the level higher than the predetermined pressure. This can suppress cavitation that could occur within the fluid coupling, and accordingly, degradation in motive power transfer capability of the fluid coupling can be suppressed.

Still preferably, the fluid supply method further includes the steps of: determining whether motive power transmitted to the fluid coupling becomes greater than a predetermined value in the state where the fluid discharged from the fluid coupling is resupplied to the fluid coupling without being returned to the storage portion; and stopping resupply of the fluid discharged from the fluid coupling to the fluid coupling without returning the fluid to the storage portion, and discharging the fluid discharged from the fluid coupling to the storage portion when it is determined that the motive power transmitted to the fluid coupling becomes greater than the predetermined value.

According to this invention, it is determined whether the motive power transmitted to the fluid coupling becomes greater than a predetermined value or not in the state where the fluid discharged from the fluid coupling is resupplied to the fluid coupling without being returned to the storage portion. When the motive power transmitted to the fluid coupling becomes greater than the predetermined value, cavitation may occur unless the fluid is sufficiently supplied to the fluid coupling. Accordingly, when it is determined that the motive power transmitted to the fluid coupling becomes greater than the predetermined value, the resupply of the fluid discharged from the fluid coupling to the fluid coupling without returning the fluid to the storage portion is stopped, and the fluid discharged from the fluid coupling is discharged to the storage portion. This allows that the fluid is sufficiently supplied to the fluid coupling from the outside of the fluid coupling. Thus, cavitation that could occur in the fluid coupling can be prevented. As a result, it is possible to suppress degradation in motive power transfer capability of the fluid coupling.

Still preferably, the fluid supply method further includes the steps of: stopping resupply of the fluid discharged from the fluid coupling to the fluid coupling without returning the fluid to the storage portion, and discharging the fluid discharged from the fluid coupling to the storage portion when the state in which the fluid discharged from the fluid coupling is resupplied to the fluid coupling without being returned to the storage portion has continued for a predetermined first time period; and restarting resupply of the fluid discharged from the fluid coupling to the fluid coupling without returning the fluid to the storage portion when the state in which the resupply of the fluid discharged from the fluid coupling to the fluid coupling without returning the fluid to the storage portion is stopped has continued for a predetermined second time period.

According to this invention, when the state in which the fluid discharged from the fluid coupling is resupplied to the fluid coupling without being returned to the storage portion has continued for a predetermined first time period, the resupply of the fluid discharged from the fluid coupling to the fluid coupling, without returning the fluid to the storage portion, is stopped, and the fluid discharged from the fluid coupling is discharged to the storage portion. This can prevent the undesirable situation that the temperature of the fluid within the fluid coupling abnormally increases as the state where the fluid discharged from the fluid coupling is resupplied to the fluid coupling continues for a long time. When such a state has continued for a predetermined second time period, resupply of the fluid discharged from the fluid coupling to the fluid coupling, without returning it to the storage portion, is restarted. This can suppress the undesirable situation that the suctioned air accumulates inside the fluid coupling as the resupply of the fluid discharged from the fluid coupling to the fluid coupling is stopped in the state where there is a possibility that the temperature of the fluid outside the fluid coupling has not sufficiently increased.

Still preferably, the fluid supply method further includes the steps of: stopping resupply of the fluid discharged from the fluid coupling to the fluid coupling without returning the fluid to the storage portion, and discharging the fluid discharged from the fluid coupling to the storage portion when a temperature of the fluid within the fluid coupling has become not lower than a predetermined first temperature in the state where the fluid discharged from the fluid coupling is resupplied to the fluid coupling without being returned to the storage portion; and restarting resupply of the fluid discharged from the fluid coupling to the fluid coupling without returning the fluid to the storage portion when the temperature of the fluid within the fluid coupling has become lower than a predetermined second temperature in the state where resupply of the fluid discharged from the fluid coupling to the fluid coupling without returning the fluid to the storage portion is stopped.

According to this invention, in the state where the fluid discharged from the fluid coupling is resupplied to the fluid coupling without being returned to the storage portion, when the temperature of the fluid within the fluid coupling has become equal to or higher than a predetermined first temperature, the resupply of the fluid discharged from the fluid coupling to the fluid coupling without returning the fluid to the storage portion is stopped, and the fluid discharged from the fluid coupling is discharged to the storage portion. As such, the fluid within the fluid coupling, of which temperature has increased as the state where the fluid discharged from the fluid coupling is resupplied to the fluid coupling has continued for a long time, can be exchanged with the fluid of low temperature outside the fluid coupling. This can suppress an abnormal increase in temperature of the fluid. Further, in this state, when the temperature of the fluid within the fluid coupling becomes lower than a predetermined second temperature, resupply of the fluid discharged from the fluid coupling to the fluid coupling, without returning the fluid to the storage portion, is restarted. This can suppress the undesirable situation that the suctioned air accumulates inside the fluid coupling as the resupply of the fluid discharged from the fluid coupling to the fluid coupling is stopped in the state where there is a possibility that the temperature of the fluid outside the fluid coupling has not sufficiently increased.

BRIEF DESCRIPTION OF THE DRAWINGS

FIG. 3 shows an operation table representing correspondence of respective gears with respective brakes and clutches.

FIGS. 8 and 9 show the oil hydraulic circuit in the state where the ATF discharged from the torque converter is resupplied to the torque converter.

BEST MODES FOR CARRYING OUT THE INVENTION

Figure 1:
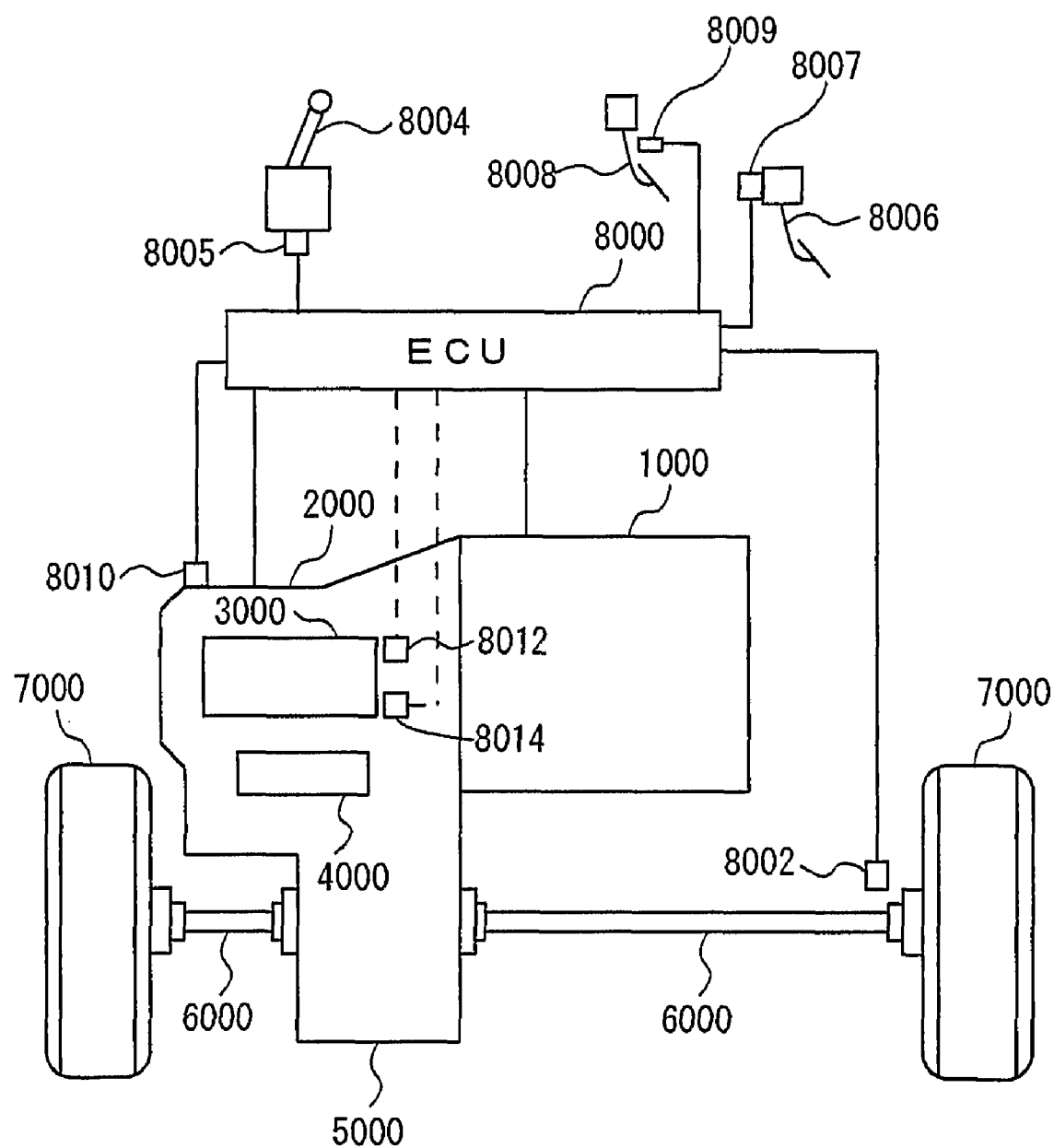
FIG. 1 is a control block diagram showing a vehicle incorporating a fluid supply device according to an embodiment of the present invention.

Hereinafter, an embodiment of the present invention will be described with reference to the drawings. In the following, the same elements have the same reference characters allotted, and their designation and function are also identical. Therefore, detailed description thereof will not be repeated.

Referring to FIG. 1, a vehicle incorporating a fluid supply device according to an embodiment of the present invention will be described. This vehicle is an FF (Front engine Front drive) vehicle. It is noted that the vehicle incorporating the fluid supply device according to the present embodiment is not limited to an FF vehicle.

The vehicle includes an engine 1000, a transmission 2000, a planetary gear unit 3000 constituting a portion of transmission 2000, an oil hydraulic circuit 4000 constituting a portion of transmission 2000, a differential gear 5000, a drive shaft 6000, a front wheel 7000, and an ECU (Electronic Control Unit) 8000.

Engine 1000 is an internal combustion engine that burns a mixture consisting of fuel injected from an injector (not shown) and air, inside a combustion chamber of a cylinder. A piston in the cylinder is pushed down by the combustion, whereby a crankshaft is rotated. An external combustion engine may be employed instead of an internal combustion engine. Further, engine 1000 may be substituted with a rotating electric machine.

Transmission 2000 converts the revolution speed of the crankshaft to a desired revolution speed for speed change by implementing a desired gear. The output gear of transmission 2000 meshes with differential gear 5000.

A driveshaft 6000 is coupled to differential gear 5000 by spline-fitting. Motive power is transmitted to the left and right front wheels 7000 via driveshaft 6000.

A vehicle speed sensor 8002, a position switch 8005 of a shift lever 8004, an idle switch 8007 of an accelerator pedal 8006, a stop lamp switch 8009 provided at a brake pedal 8008, an oil temperature sensor 8010, an input shaft speed sensor 8012, and an output shaft speed sensor 8014 are connected to ECU 8000 via a harness and the like.

Vehicle speed sensor 8002 senses the vehicle speed from the number of revolutions of drive shaft 6000, and transmits a signal representing the sensed result to ECU 8000. The position of shift lever 8004 is sensed by position switch 8005, and a signal representing the sensed result is transmitted to ECU 8000. A gear of transmission 2000 is automatically implemented corresponding to the position of shift lever 8004. Additionally, the driver may operate to select a manual shift mode in which the driver can select a gear arbitrarily.

Idle switch 8007 is "ON" when the position of accelerator pedal 8006 is "0"; otherwise it is "OFF". An accelerator pedal position sensor sensing the position of the accelerator pedal may be provided instead of or in addition to idle switch 8007.

Stop lamp switch 8009 senses the ON/OFF state of brake pedal 8008, and transmits a signal representing the sensed result to ECU 8000. A stroke sensor sensing the stroke level of brake pedal 8008 may be provided instead of or in addition to stop lamp switch 8009.

Oil temperature sensor 8010 senses the temperature of the ATF (Automatic Transmission Fluid) of transmission 2000, and transmits a signal representing the sensed result to ECU 8000.

Input shaft speed sensor 8012 senses the input shaft revolution NI of transmission 2000, and transmits a signal representing the sensed result to ECU 8000. Output shaft speed sensor 8014 senses the output shaft revolution NO of transmission 2000, and transmits a signal representing the sensed result to ECU 8000.

ECU 8000 controls various devices such that the vehicle attains a desired running state based on signals transmitted from vehicle speed sensor 8002, position switch 8005, idle switch 8007, stop lamp switch 8009, oil temperature sensor 8010, input shaft speed sensor 8012, output shaft speed sensor 8014, and the like, as well as the map and program stored in a ROM (Read Only Memory).

Figure 2:
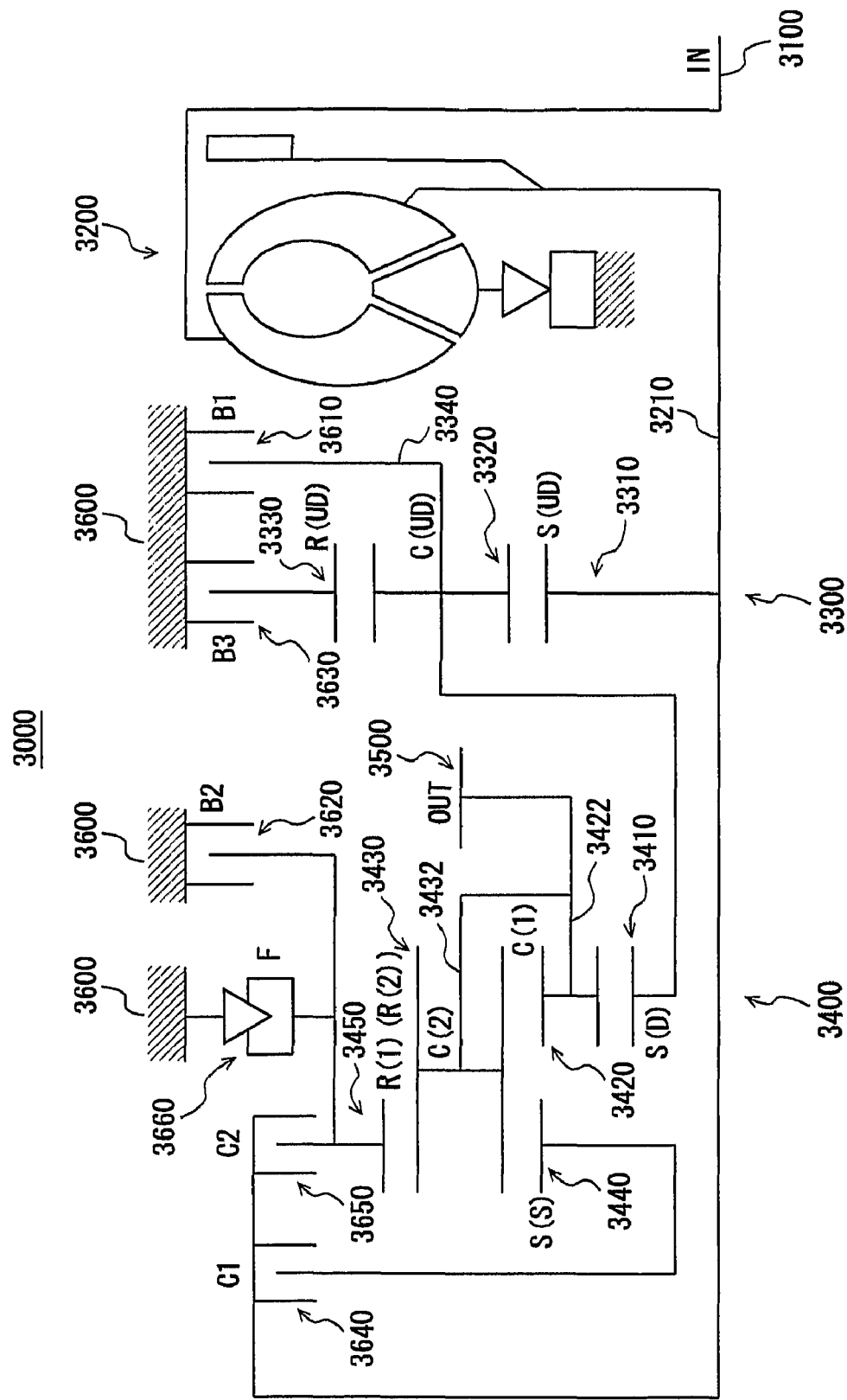
FIG. 2 is a skeletal view of a planetary gear unit.

Planetary gear unit 3000 will now be described with reference to FIG. 2. Planetary gear unit 3000 is connected to a torque converter 3200 having an input shaft 3100 coupled to the crankshaft. Planetary gear unit 3000 includes a first set of planetary gear mechanism 3300, a second set of planetary gear mechanism 3400, an output gear 3500, B1, B2, and B3 brakes 3610, 3620 and 3630 fixed to a gear case 3600, C1 and C2 clutches 3640 and 3650, and a one way clutch F3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to an output shaft 3210 of torque converter 3200. Pinion gear 3320 is rotatably supported on carrier C (UD) 3340. Pinion gear 3320 engages with sun gear S (UD) 3310 and ring gear R (UD) 3330.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

Sun gear S (D) 3410 is coupled to carrier C (UD) 3340. Short pinion gear 3420 is rotatably supported on carrier C (1) 3422. Short pinion gear 3420 engages with sun gear S (D) 3410 and long pinion gear 3430. Carrier C (1) 3422 is coupled with output gear 3500.

Long pinion gear 3430 is rotatably supported on carrier C (2) 3432. Long pinion gear 3430 engages with short pinion gear 3420, sun gear S (S) 3440, and ring gear R (1) (R (2)) 3450. Carrier C (2) 3432 is coupled with output gear 3500.

Sun gear S (S) 3440 is coupled to output shaft 3210 of torque converter 3200 via C1 clutch 3640. Ring gear R (1) (R (2)) 3450 is fixed to gear case 3600 by B2 brake 3620, and coupled to output shaft 3210 of torque converter 3200 by C2 clutch 3650. Ring gear R (1) (R (2)) 3450 is coupled to one way clutch F3660, and is disabled in rotation during the drive of first gear.

One way clutch F3660 is provided in parallel with B2 brake 3620. Specifically, one way clutch F3660 has the outer race fixed to gear case 3600, and the inner race coupled to ring gear R (1) (R (2)) 3450 via the rotation shaft.

FIG. 3 is an operation table representing the relation between respective gears and operation states of respective clutches and brakes. By operating each brake and each clutch based on the combination shown in the operation table, the forward gears of first gear to sixth gear and the reverse gear are implemented.

Since one way clutch F3660 is provided in parallel with B2 brake 3620, it is not necessary to engage B2 brake 3620 in a driving state from the engine side (acceleration) during implementation of first gear (1ST), as indicated in the operation table. In the present embodiment, one way clutch F3660 restricts the rotation of ring gear R (1) (R (2)) 3450 during the drive of first gear. When engine brake is effected, one way clutch F3660 does not restrict the rotation of ring gear R (1) (R (2)) 3450.

Figure 4:
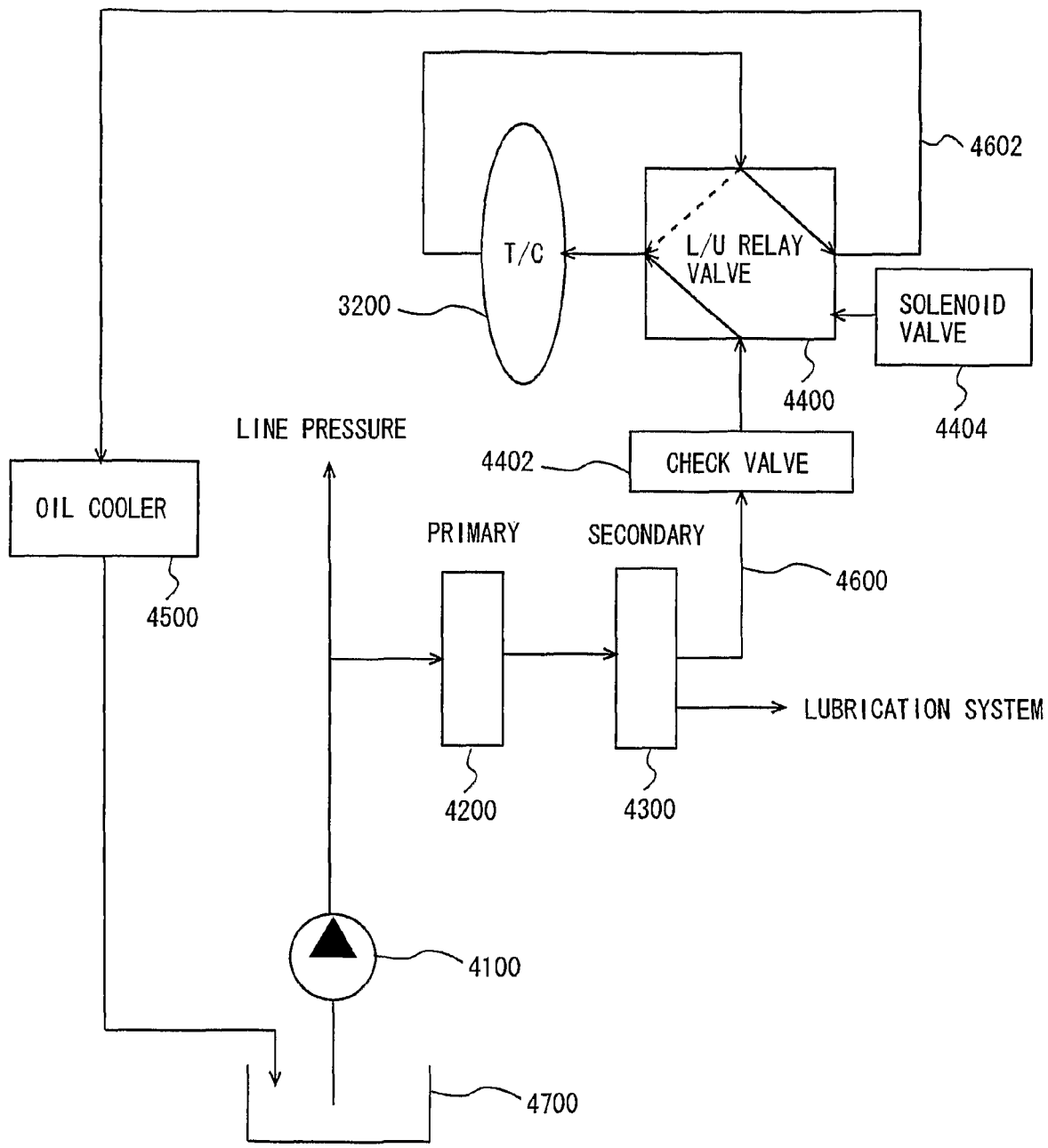
FIG. 4 shows an oil hydraulic circuit.

Oil hydraulic circuit 4000 will now be described with reference to FIG. 4. FIG. 4 represents only the portion of oil hydraulic circuit 4000 related to the present invention.

Oil hydraulic circuit 4000 includes an oil pump 4100, a primary regulator valve 4200, a secondary regulator valve 4300, a lock-up relay valve 4400, and an oil cooler 4500.

Oil pump 4100 is coupled with the crankshaft of engine 1000. By rotation of the crankshaft, oil pump 4100 is driven to generate oil pressure. Oil pump 4100 suctions the ATF stored in an oil pan 4700 provided beneath transmission 2000 via a strainer (not shown), and delivers the ATF to oil hydraulic circuit 4000.

Primary regulator valve 4200 adjusts the oil pressure of the ATF delivered by oil pump 4100, whereby line pressure is obtained. Secondary regulator valve 4300 adjusts the output oil pressure from primary regulator valve 4200.

The output oil pressure from secondary regulator valve 4300 is supplied to a lubrication system of transmission 2000, and also supplied to torque converter 3200 via a check valve 4402 and lock-up relay valve 4400 provided on the first oil path 4600.

Lock-up relay valve 4400 operates with the output oil pressure from a solenoid valve 4404 controlled by ECU 8000, as the pilot pressure. Lock-up relay valve 4400 is selectively switched between the state of guiding the ATF passed through and discharged from torque converter 3200 to the second oil path 4602 and the state of resupplying it to torque converter 3200.

In the state of resupplying the ATF discharged from torque converter 3200 to torque converter 3200, lock-up relay valve 4400 disconnects the second oil path 4602 from torque converter 3200.

Check valve 4402 allows the flow of the ATF from secondary regulator valve 4300 to torque converter 3200, and prevents the reverse flow of the ATF from torque converter 3200 to secondary regulator valve 4300.

Check valve 4402 is set such that, when lock-up relay valve 4400 is in the state of resupplying the ATF discharged from torque converter 3200 to torque converter 3200, the ATF of the amount equivalent to the amount leaked from the closed circuit including torque converter 3200 is replenished to keep the oil pressure within torque converter 3200 at a level not lower than a predetermined oil pressure. The oil pressure within torque converter 3200 at this time is the lowest possible oil pressure taking account of leakage of the ATF as well as cavitation.

Oil cooler 4500 allows heat exchange between the ATF guided to second oil path 4602 and the air for cooling, when lock-up relay valve 4400 is in the state of guiding the ATF discharged from torque converter 3200 to second oil path 4602. The ATF having passed through oil cooler 4500 is returned to oil pan 4700. It is noted that a cooler bypass valve may be provided on an oil path bypassing oil cooler 4500 so as to cause the ATF to return to oil pan 4700 without passing through oil cooler 4500.

Figure 5:
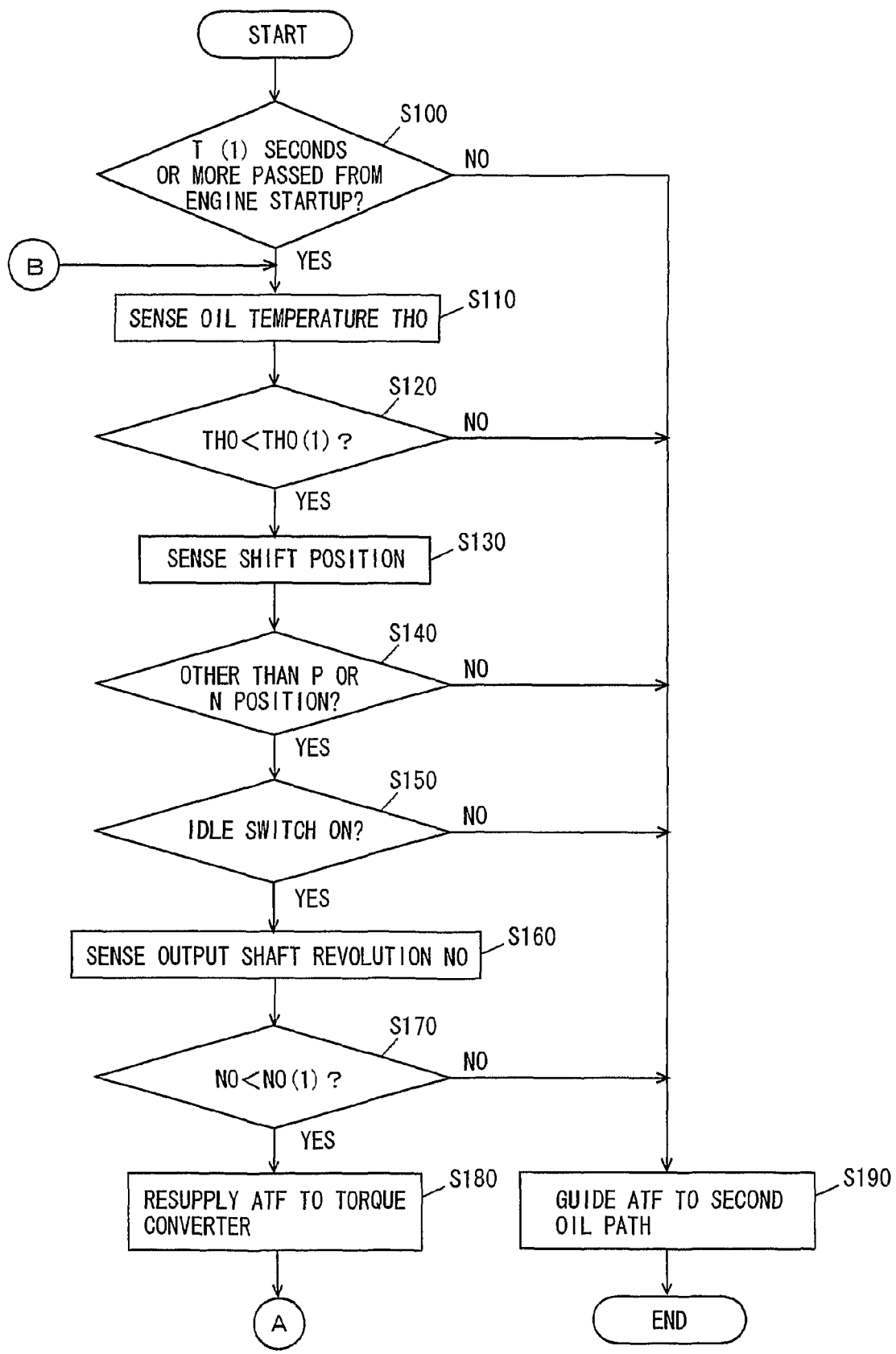
FIGS. 5 and 6 are flowcharts showing a control structure of a program executed in the ECU shown in FIG. 1.
Figure 6:
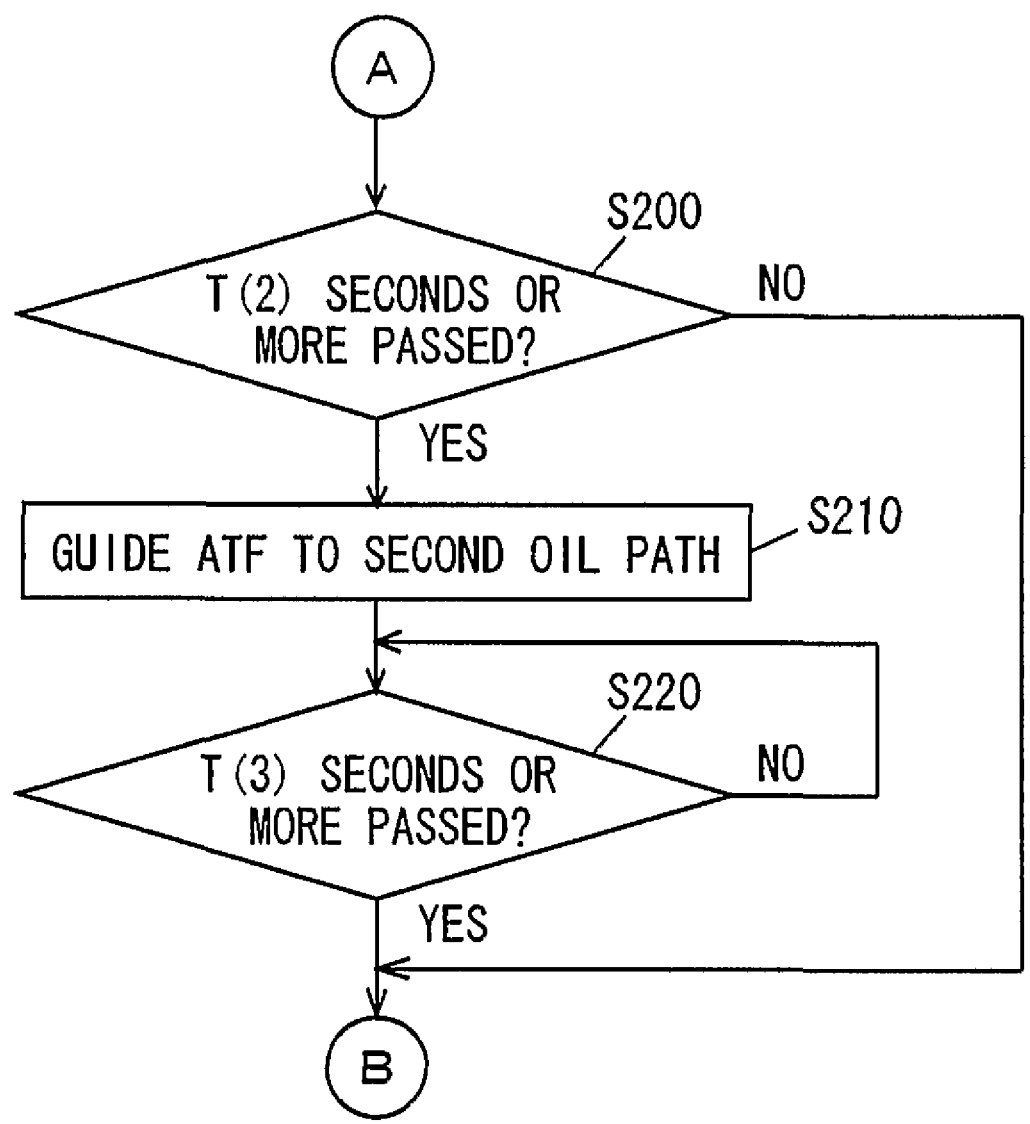

A control structure of the program executed by the ECU 8000 will now be described with reference to FIGS. 5 and 6.

In step (hereinafter, abbreviated as "S") 100, ECU 8000 determines whether T (1) seconds or more have passed from the startup of engine 1000. If T (1) seconds or more have passed from the startup of engine 1000 (YES in S100), the process proceeds to S110. If not (NO in S100), the process proceeds to S190.

In S110, ECU 8000 senses oil temperature THO based on a signal transmitted from oil temperature sensor 8010. In S120, ECU 8000 determines whether oil temperature THO<a threshold value THO (1). If oil temperature THO<threshold value THO (1) (YES in S120), the process proceeds to S130. If not (NO in S120), the process proceeds to S190.

In S130, ECU 8000 senses the position of shift lever 8004 (shift position) based on a signal transmitted from position switch 8005.

In S140, ECU 8000 determines whether the position of shift lever 8004 is other than the P (parking) position or N (neutral) position. If the position of shift lever 8004 is other than the P position or N position (YES in S140), the process proceeds to S150. If not (NO in S140), the process proceeds to S190.

In S150, ECU 8000 determines whether idle switch 8007 is ON or not, i.e., whether the accelerator pedal position is "0" or not, based on a signal transmitted from idle switch 8007. By determining whether idle switch 8007 is ON or not, it is determined whether the driver is intended to run, i.e., whether the driving force transmitted from engine 1000 to torque converter 3200 is greater than "0". If idle switch 8007 is ON (YES in S150), the process proceeds to S160. If not (NO in S150), the process proceeds to S190.

In S160, ECU 8000 senses the output shaft revolution NO of transmission 2000 based on a signal transmitted from output shaft speed sensor 8014. In S170, ECU 8000 determines whether output shaft revolution NO<a threshold value NO (1). If output shaft revolution NO<threshold value NO (1) (YES in S170), the process proceeds to S180. If not (NO in S180), the process proceeds to S190.

In S180, ECU 8000 outputs a control signal to solenoid valve 4404 to control solenoid valve 4404 to cause lock-up relay valve 4400 to enter the state of resupplying the ATF discharged from torque converter 3200 to torque converter 3200.

In S190, ECU 8000 outputs a control signal to solenoid valve 4404 to control solenoid valve 4404 to cause lock-up relay valve 4400 to enter the state of guiding the ATF discharged from torque converter 3200 to second oil path 4602.

In S200, ECU 8000 determines whether T (2) seconds have passed since establishment of the state of resupplying the ATF discharged from torque converter 3200 to torque converter 3200. If T (2) seconds have passed since establishment of the state of resupplying the ATF discharged from torque converter 3200 to torque converter 3200 (YES in S200), the process proceeds to S210. If not (NO in S200), the process returns to S110.

In S210, ECU 8000 outputs a control signal to solenoid valve 4404 to control solenoid valve 4404 to cause lock-up relay valve 4400 to enter the state of guiding the ATF discharged from torque converter 3200 to second oil path 4602.

In S220, ECU 8000 determines whether T (3) seconds have passed since establishment of the state of guiding the ATF discharged from torque converter 3200 to second oil path 4602. If T (3) seconds have passed since establishment of the state of guiding the ATF discharged from torque converter 3200 to second oil path 4602 (YES in S220), the process returns to S110 in FIG. 5. If not (NO in S220), the process returns to S220.

An operation of the fluid supply device according to the present embodiment based on the above-described structure and flowchart will now be described.

Figure 7:
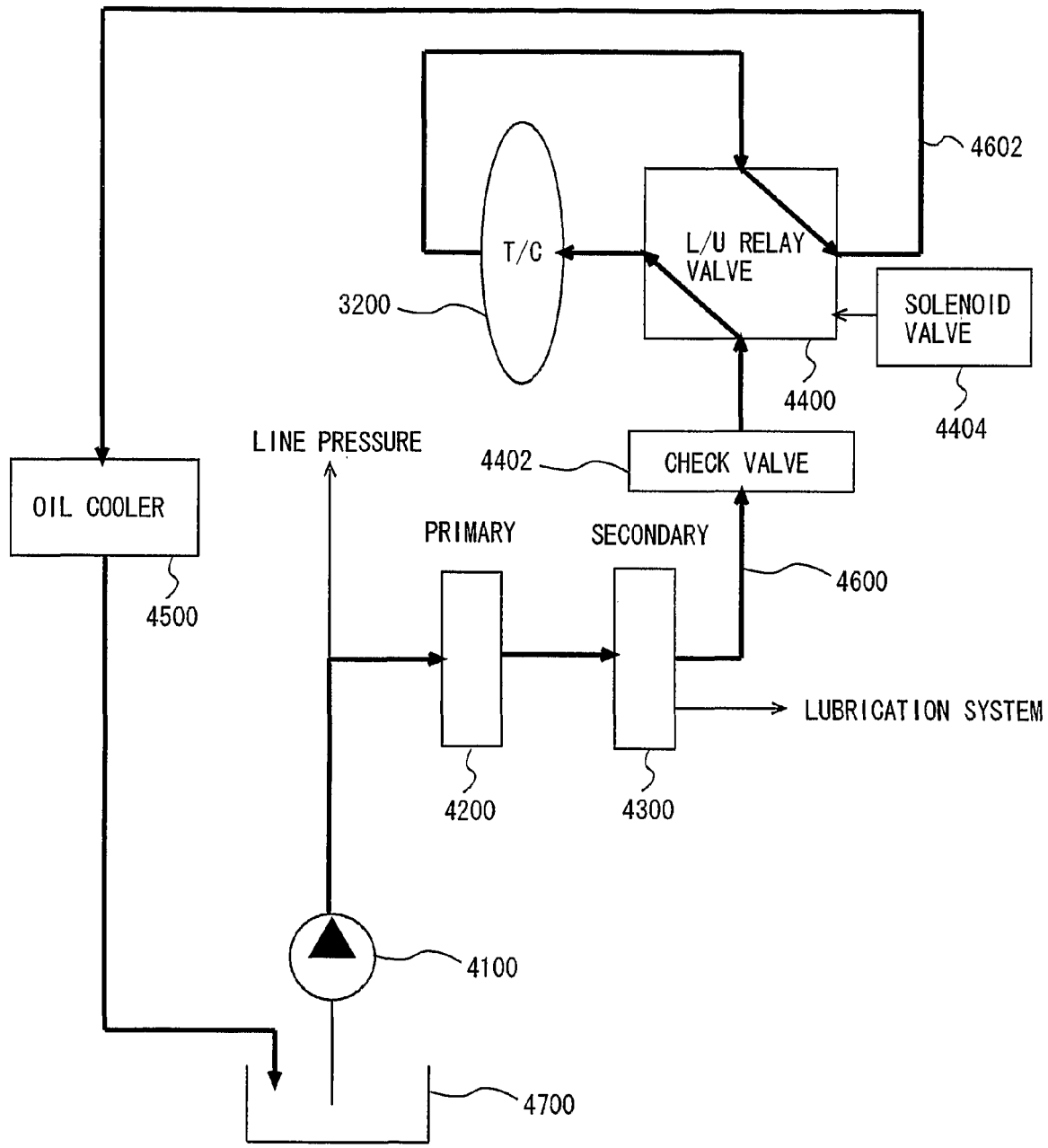
FIG. 7 shows the oil hydraulic circuit in the state where the ATF discharged from a torque converter is guided to a second oil path.

It is presumable that torque converter 3200 is not fully filled with the ATF while T (1) seconds have not passed from the startup of engine 1000 (NO in S100). Accordingly, lock-up relay valve 4400 is set to the state of guiding the ATF discharged from torque converter 3200 to second oil path 4602, as shown in FIG. 7 (S190). It is thus possible to circulate the ATF within oil hydraulic circuit 4000 to fill torque converter 3200 with the ATF.

Here, in the state where oil temperature THO of the ATF<threshold value THO (1) (YES in S120) and the oil temperature is presumably low, the oil level within oil pan 4700 would be low with a decrease in volume of the ATF. Further, viscosity of the ATF would be high with such a low oil temperature, and thus, it is less likely that the ATF is returned to oil pan 4700, which also leads to a lowered oil level.

When the oil level is low, the air within oil pan 4700 may be suctioned by oil pump 4100 together with the ATF. If the ATF within oil hydraulic circuit 4000 is circulated in this state and thus the suctioned air is fed to torque converter 3200, the air would accumulate in torque converter 3200, which would possibly degrade the motive power transfer capability of torque converter 3200.

This may cause a lost drive phenomenon where the driving force transmitted to transmission 2000 decreases even if the driver tries to run the vehicle by setting shift lever 8004 to the position other than the P or N position (D (drive) position or R (reverse) position) (YES in S140).

Figure 8:
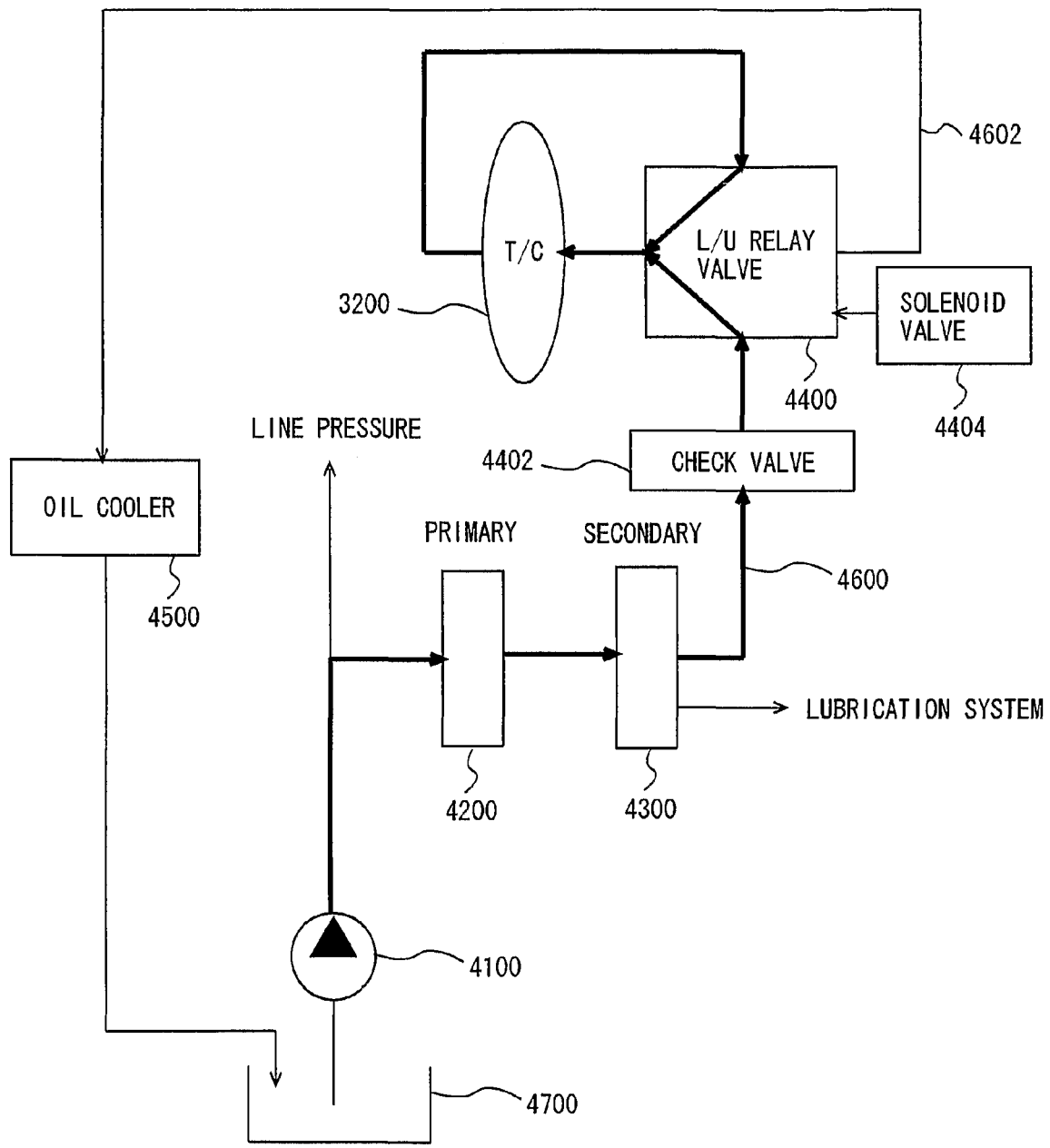

In view of the foregoing, in the case where idle switch 8007 is ON (YES in S150) and output shaft revolution NO<threshold value NO (1) (YES in S170), and thus it can be said that the vehicle is stopped, lock-up relay valve 4400 is set to the state of resupplying the ATF discharged from torque converter 3200 to torque converter 3200, as shown in FIG. 8 (S180).

Accordingly, second oil path 4602 is disconnected from torque converter 3200, and the closed circuit having an independent oil path supplying the ATF to torque converter 3200 is obtained. This can prevent the ATF with the air mixed therein from being fed to torque converter 3200 via first oil path 4600. As a result, it is possible to suppress accumulation of the air within torque converter 3200.

At this time, torque converter 3200 is replenished with the ATF of the amount equivalent to that of the ATF leaked from torque converter 3200 via check valve 4402, so that the oil pressure within torque converter 3200 is kept at the level of not lower than the predetermined oil pressure level. As such, generation of cavitation within torque converter 3200 can be suppressed, and degradation of the motive power transfer capability as well as generation of abnormal noise can also be suppressed.

Meanwhile, if the state where the oil path supplying the ATF to torque converter 3200 forms an independent closed circuit is maintained for a long period of time, the oil temperature of the ATF within torque converter 3200 may become abnormally high. In order to suppress such an abnormal increase of the oil temperature, when T (2) seconds have passed since establishment of the state of resupplying the ATF discharged from torque converter 3200 to torque converter 3200 (YES in S200), it is temporarily returned to the state of guiding the ATF discharged from torque converter 3200 to second oil path 4602, as shown in FIG. 7 (S210). This enables exchange of the ATF within torque converter 3200, and thus, the increase of the oil temperature within torque converter 3200 can be suppressed.

At this time, although the ATF of high oil temperature within the closed circuit and the ATF of low oil temperature outside the closed circuit are mixed together, the relation of oil temperature THO of ATF<threshold value THO (1) may still hold (YES in S120) during the very cold state for example, in which case the lost drive phenomenon may occur.

Thus, when T (3) seconds have additionally passed (YES in S220) after returning to the state of guiding the ATF to second oil path 4602 (S210), if the conditions for forming the closed circuit are satisfied (YES in S120, YES in S140, YES in S150 and YES in S170), the ATF discharged from torque converter 3200 is again resupplied to torque converter 3200, as shown in FIG. 8 (S180).

In this manner, it is possible to recover the closed circuit as long as the conditions for forming the closed circuit are satisfied, to thereby suppress the lost drive phenomenon.

Meanwhile, during the state where oil temperature THO≧threshold value THO (1) (NO in S120), the oil level is sufficiently high, meaning that suction of the air is less likely to occur. Further, in the state where the shift position is the P or N position (NO in S130), the driving force is not transmitted from engine 1000 to transmission 2000 to run the vehicle. In these states, the lost drive phenomenon would not occur.

The same applies to the case where, after lock-up relay valve 4400 is once set to the state of resupplying the ATF discharged from torque converter 3200 to torque converter 3200 (S180), oil temperature THO has become equal to or higher than threshold value THO (1) (NO in S120), or the shift position has become the P or N position (NO in S130).

In these cases, the necessity to prevent the air from entering torque converter 3200 is low, so that lock-up relay valve 4400 is set to the state of guiding the ATF discharged from torque converter 3200 to second oil path 4602, as shown in FIG. 7 (S190).

Further, in the case where idle switch 8005 is OFF (NO in S140) or in the case where output shaft revolution NO≧threshold value NO (1) (NO in S170), the driving force may be transmitted from engine 1000 to torque converter 3200 to run the vehicle.

The same applies to the state where, after lock-up relay valve 4400 is once set to the state of resupplying the ATF discharged from torque converter 3200 to torque converter 3200 (S180), idle switch 8005 is turned OFF (NO in S140), or output shaft revolution NO has become equal to or greater than threshold value NO (1) (NO in S170).

In the state where the driving force is transmitted to torque converter 3200, i.e., in the state where torque converter 3200 transmits the driving force of engine 1000 to transmission 2000, cavitation may occur unless the ATF within torque converter 3200 is sufficiently pressurized.

Thus, as shown in FIG. 7, lock-up relay valve 4400 is set to the state of guiding the ATF discharged from torque converter 3200 to second oil path 4602 (S190). In doing so, it is possible to supply the oil pressure sufficiently pressurized by oil pump 4100 to torque converter 3200, and thus, to sufficiently increase the oil pressure within torque converter 3200. Accordingly, generation of cavitation is suppressed, and degradation of the motive power transfer capability can also be suppressed.

As described above, according to the fluid supply device of the present invention, in the state where the oil temperature is presumably low with oil temperature THO of ATF<threshold value THO (1), the second oil path for guiding the ATF discharged from the torque converter to the oil pan is disconnected from the torque converter, and the ATF discharged from the torque converter is resupplied to the torque converter. This can prevent the air suctioned by the oil pump from being fed to and accumulating in the torque converter. Accordingly, generation of the lost drive phenomenon can be suppressed, and degradation of the motive power transfer capability of the torque converter can also be suppressed.

In the present embodiment, the destination of the ATF discharged from torque converter 3200 has been changed using lock-up relay valve 4400 that is switched by solenoid valve 4404. Alternatively, the destination of the ATF may be changed using a shape memory alloy such as bimetal.

Further, since it is not preferable that the air accumulates in torque converter 3200 even when the shift position is the P or N position (NO in S130), it may be configured such that the second oil path is disconnected from the torque converter to allow the ATF discharged from the torque converter to be resupplied to the torque converter, regardless of the shift position.

Still further, as shown in FIG. 9, an oil temperature sensor 8016 may be provided at the position where the oil temperature of the ATF within torque converter 3200 can be sensed even during the state where the oil path supplying the ATF to torque converter 3200 forms the closed circuit. In this case, after the formation of the closed circuit, the closed circuit may temporarily be interrupted when the oil temperature of the ATF within torque converter 3200 becomes equal to or greater than a threshold value THO (2), and thereafter, the closed circuit may be formed again when the oil temperature of the ATF within torque converter 3200 becomes lower than a threshold value THO (3).

Figure 10:
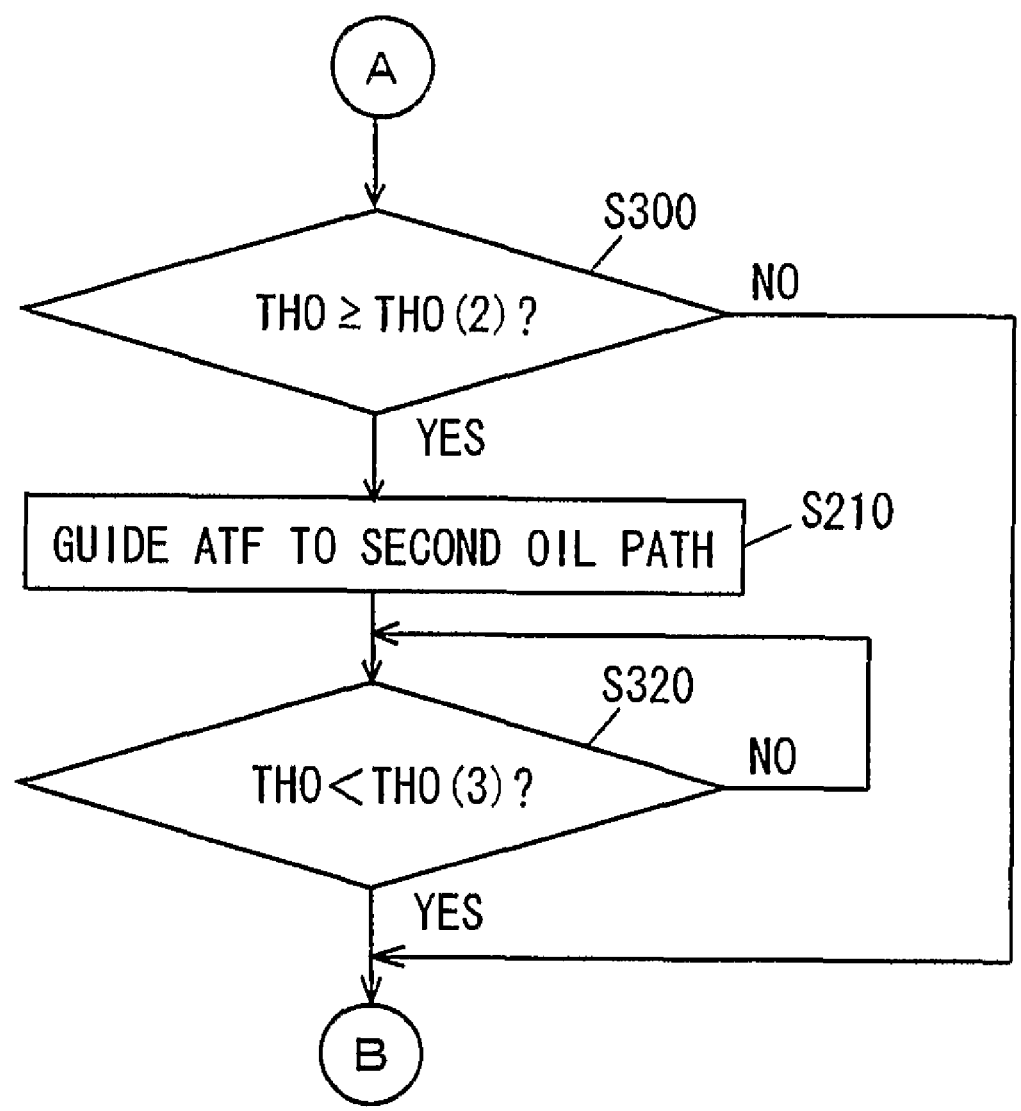
FIG. 10 is another flowchart showing a control structure of a program executed in the ECU shown in FIG. 1.

Hereinafter, a control structure of a program that is executed by ECU 8000 for interrupting the formation of the closed circuit when the oil temperature of the ATF within torque converter 3200 becomes equal to or greater than threshold value THO (2) and, thereafter, forming the closed circuit again when the oil temperature of the ATF within torque converter 3200 becomes lower than threshold value THO (3), will be described with reference to FIG. 10.

In the program explained below, the above-described steps S200 and S220 are replaced with S300 and S320, respectively. The other processing is identical to that of the above-described program, and therefore, detailed description thereof will not be repeated here.

In S300, ECU 8000 determines whether the oil temperature of the ATF within torque converter 3200 is equal to or higher than threshold value THO (2). If the oil temperature of the ATF within torque converter 3200 is equal to or higher than threshold value THO (2) (YES in S300), the process proceeds to S210. If not (NO in S300), the process returns to S110.

In S320, ECU 8000 determines whether the oil temperature of the ATF within torque converter 3200 is lower than threshold value THO (3). If the oil temperature of the ATF within torque converter 3200 is lower than threshold value THO (3) (YES in S320), the process returns to S110 in FIG. 5. If not (NO in S320), the process returns to S320.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A fluid supply device of a fluid coupling, comprising:
   a delivery portion delivering fluid stored in a storage portion provided in a transmission to a fluid coupling via a first flow path;
   a second flow path guiding the fluid discharged from said fluid coupling to said storage portion; and
   a supply portion disconnecting said second flow path from said fluid coupling and resupplying the fluid discharged from said fluid coupling to said fluid coupling when a temperature of the fluid within said transmission is lower than a predetermined temperature.

2. The fluid supply device of a fluid coupling according to claim 1, further comprising a maintaining portion maintaining pressure of the fluid supplied to said fluid coupling at a level higher than a predetermined pressure in the state where said second flow path is disconnected from said fluid coupling and the fluid discharged from said fluid coupling is being resupplied to said fluid coupling.

3. The fluid supply device of a fluid coupling according to claim 1, further comprising:
   a stopping portion establishing communication between said second flow path and said fluid coupling and stopping resupply of the fluid discharged from said fluid coupling to said fluid coupling when the state in which said second flow path is disconnected from said fluid coupling and the fluid discharged from said fluid coupling is resupplied to said fluid coupling has continued for a predetermined first time period; and
   a supply restarting portion disconnecting said second flow path from said fluid coupling and resupplying the fluid discharged from said fluid coupling to said fluid coupling when the state in which said second flow path and said fluid coupling are in communication with each other and resupply of the fluid discharged from said fluid coupling to said fluid coupling is stopped has continued for a predetermined second time period.

4. The fluid supply device of a fluid coupling according to claim 1, further comprising:
   a stopping portion establishing communication between said second flow path and said fluid coupling and stopping resupply of the fluid discharged from said fluid coupling to said fluid coupling when a temperature of the fluid within said fluid coupling has become not lower than a predetermined first temperature in the state where said second flow path is disconnected from said fluid coupling and the fluid discharged from said fluid coupling is being resupplied to said fluid coupling; and
   a supply restarting portion disconnecting said second flow path from said fluid coupling and resupplying the fluid discharged from said fluid coupling to said fluid coupling when the temperature of the fluid within said fluid coupling has become lower than a predetermined second temperature in the state where said second flow path is in communication with said fluid coupling and resupply of the fluid discharged from said fluid coupling to said fluid coupling is stopped.

5. A fluid supply device of a fluid coupling, comprising:
   a delivery portion delivering fluid stored in a storage portion to a fluid coupling via a first flow path;
   a second flow path guiding the fluid discharged from said fluid coupling to said storage portion;
   a supply portion disconnecting said second flow path from said fluid coupling and resupplying the fluid discharged from said fluid coupling to said fluid coupling when a temperature of the fluid supplied to said fluid coupling is lower than a predetermined temperature;

a determination portion determining whether motive power transmitted to said fluid coupling becomes greater than a predetermined value; and a stopping portion establishing communication between said second flow path and said fluid coupling and stopping resupply of the fluid discharged from said fluid coupling to said fluid coupling when it is determined that the motive power transmitted to said fluid coupling becomes greater than the predetermined value in the state where said second flow path is disconnected from said fluid coupling and the fluid discharged from said fluid coupling is being resupplied to said fluid coupling.

6. A fluid supply device of a fluid coupling, comprising:

delivery means for delivering fluid stored in a storage portion provided in a transmission to a fluid coupling via a first flow path;

a second flow path guiding the fluid discharged from said fluid coupling to said storage portion; and means for disconnecting said second flow path from said fluid coupling and resupplying the fluid discharged from said fluid coupling to said fluid coupling when a temperature of the fluid within said transmission is lower than a predetermined temperature.

7. The fluid supply device of a fluid coupling according to claim 6, further comprising means for maintaining pressure of the fluid supplied to said fluid coupling at a level higher than a predetermined pressure in the state where said second flow path is disconnected from said fluid coupling and the fluid discharged from said fluid coupling is being resupplied to said fluid coupling.

8. The fluid supply device of a fluid coupling according to claim 6, further comprising:

means for establishing communication between said second flow path and said fluid coupling and stopping resupply of the fluid discharged from said fluid coupling to said fluid coupling when the state in which said second flow path is disconnected from said fluid coupling and the fluid discharged from said fluid coupling is resupplied to said fluid coupling has continued for a predetermined first time period; and means for disconnecting said second flow path from said fluid coupling and resupplying the fluid discharged from said fluid coupling to said fluid coupling when the state in which said second flow path and said fluid coupling are in communication with each other and resupply of the fluid discharged from said fluid coupling to said fluid coupling is stopped has continued for a predetermined second time period.

9. The fluid supply device of a fluid coupling according to claim 6, further comprising:

means for establishing communication between said second flow path and said fluid coupling and stopping resupply of the fluid discharged from said fluid coupling to said fluid coupling when a temperature of the fluid within said fluid coupling has become not lower than a predetermined first temperature in the state where said second flow path is disconnected from said fluid coupling and the fluid discharged from said fluid coupling is being resupplied to said fluid coupling; and means for disconnecting said second flow path from said fluid coupling and resupplying the fluid discharged from said fluid coupling to said fluid coupling when the temperature of the fluid within said fluid coupling has become lower than a predetermined second temperature in the state where said second flow path is in communication with said fluid coupling and resupply of the fluid discharged from said fluid coupling to said fluid coupling is stopped.

10. A fluid supply device of a fluid coupling, comprising:

delivery means for delivering fluid stored in a storage portion to a fluid coupling via a first flow path;

a second flow path guiding the fluid discharged from said fluid coupling to said storage portion;

means for disconnecting said second flow path from said fluid coupling and resupplying the fluid discharged from said fluid coupling to said fluid coupling when a temperature of the fluid supplied to said fluid coupling is lower than a predetermined temperature;

means for determining whether motive power transmitted to said fluid coupling becomes greater than a predetermined value; and means for establishing communication between said second flow path and said fluid coupling and stopping resupply of the fluid discharged from said fluid coupling to said fluid coupling when it is determined that the motive power transmitted to said fluid coupling becomes greater than the predetermined value in the state where said second flow path is disconnected from said fluid coupling and the fluid discharged from said fluid coupling is being resupplied to said fluid coupling.

11. A fluid supply method of a fluid coupling for supplying fluid stored in a storage portion provided in a transmission, comprising the steps of:

discharging fluid discharged from said fluid coupling to said storage portion when a temperature of the fluid within said transmission is not lower than a predetermined temperature; and resupplying the fluid discharged from said fluid coupling to said fluid coupling, without returning the fluid to said storage portion, when the temperature of the fluid within said transmission is lower than said predetermined temperature.

12. The fluid supply method of a fluid coupling according to claim 11, further comprising the step of maintaining pressure of the fluid supplied to said fluid coupling at a level higher than a predetermined pressure in the state where the fluid discharged from said fluid coupling is resupplied to said fluid coupling without being returned to said storage portion.

13. The fluid supply method of a fluid coupling according to claim 11, further comprising the steps of:

stopping resupply of the fluid discharged from said fluid coupling to said fluid coupling without returning the fluid to said storage portion, and discharging the fluid discharged from said fluid coupling to said storage portion when the state in which the fluid discharged from said fluid coupling is resupplied to said fluid coupling without being returned to said storage portion has continued for a predetermined first time period; and restarting resupply of the fluid discharged from said fluid coupling to said fluid coupling without returning the fluid to said storage portion when the state in which the resupply of the fluid discharged from said fluid coupling to said fluid coupling without returning the fluid to said storage portion is stopped has continued for a predetermined second time period.

14. The fluid supply method of a fluid coupling according to claim 11, further comprising the steps of:

stopping resupply of the fluid discharged from said fluid coupling to said fluid coupling without returning the fluid to said storage portion, and discharging the fluid discharged from said fluid coupling to said storage portion when a temperature of the fluid within said fluid coupling has become not lower than a predetermined first temperature in the state where the fluid discharged from said fluid coupling is resupplied to said fluid coupling without being returned to said storage portion; and restarting resupply of the fluid discharged from said fluid coupling to said fluid coupling without returning the fluid to said storage portion when the temperature of the fluid within said fluid coupling has become lower than a predetermined second temperature in the state where resupply of the fluid discharged from said fluid coupling to said fluid coupling without returning the fluid to said storage portion is stopped.

15. A fluid supply method of a fluid coupling for supplying fluid to said fluid coupling, comprising the steps of:

discharging fluid discharged from said fluid coupling to a storage portion when a temperature of the fluid supplied to said fluid coupling is not lower than a predetermined temperature;

resupplying the fluid discharged from said fluid coupling to said fluid coupling, without returning the fluid to said storage portion, when the temperature of the fluid supplied to said fluid coupling is lower than said predetermined temperature;

determining whether motive power transmitted to said fluid coupling becomes greater than a predetermined value in the state where the fluid discharged from said fluid coupling is resupplied to said fluid coupling without being returned to said storage portion; and stopping resupply of the fluid discharged from said fluid coupling to said fluid coupling without returning the fluid to said storage portion, and discharging the fluid discharged from said fluid coupling to said storage portion when it is determined that the motive power transmitted to said fluid coupling becomes greater than said predetermined value.

\* \* \* \* \*